United States Patent
Pinard et al.

(10) Patent No.: US 6,415,020 B1
(45) Date of Patent: Jul. 2, 2002

(54) CALL ON-HOLD IMPROVEMENTS

(75) Inventors: Deborah L. Pinard, Kanata; Edward N. Bijman, Stittsville; Helen St. Amour, Ottawa, all of (CA)

(73) Assignee: Mitel Corporation, Ontario (CA)

( * ) Notice: Subject to any disclaimer, the term of this patent is extended or adjusted under 35 U.S.C. 154(b) by 0 days.

(21) Appl. No.: 09/311,779

(22) Filed: May 13, 1999

(51) Int. Cl.⁷ .......................... H04M 1/64; H04M 11/00; H04M 3/42; H04M 1/00

(52) U.S. Cl. .................... 379/88.11; 379/74; 379/88.17; 379/93.21; 379/158; 379/202.01; 379/205.01; 379/215.01; 379/376.01

(58) Field of Search ............................. 379/34, 48, 71, 379/72, 88.01, 88.11, 88.12, 88.26, 93.21, 93.23, 100.05, 157, 158, 201, 202, 203, 204, 205, 215, 214, 73, 74, 88.42, 88.17, 93.09, 93.35, 142.08, 201.01, 202.01, 205.01, 207.01, 215.01, 265.08, 266.03, 376.01, 393

(56) References Cited

U.S. PATENT DOCUMENTS

| 4,953,159 A | * | 8/1990 | Hayden et al. ................ 370/62 |
| 5,533,110 A | | 7/1996 | Pinard et al. ................ 379/201 |
| 5,557,658 A | * | 9/1996 | Gregorek et al. ........ 379/88.25 |
| 5,568,540 A | * | 10/1996 | Greco et al. ............. 379/88.25 |
| 5,631,954 A | | 5/1997 | Evans et al. ................ 379/201 |
| 5,638,494 A | | 6/1997 | Pinard et al. .................. 395/60 |
| 5,680,447 A | | 10/1997 | Diamond et al. .......... 379/67.1 |
| 5,875,231 A | * | 2/1999 | Farfan et al. .............. 379/67.1 |
| 6,192,118 B1 | * | 2/2001 | Bayless et al. ............. 379/201 |

FOREIGN PATENT DOCUMENTS

| EP | 0 227 327 A2 | 11/1996 |
| GB | 2 295 747 A | 11/1995 |
| WO | WO 97/08879 | 3/1997 |

\* cited by examiner

Primary Examiner—Allan Hoosain
(74) Attorney, Agent, or Firm—Fenwick & West LLP

(57) ABSTRACT

In a communication system wherein a communication connection is established between a communication apparatus of a first subscriber and a communication apparatus of a second subscriber, a method of terminating the communication connection by a subscriber placed on hold comprises the steps of displaying to the on hold subscriber a prompt to leave a message; in response to selection of the prompt, recording the message left by the on hold subscriber; transmitting the message to the other subscriber; terminating the communication connection; and providing a visual indication to the other subscriber that the communication connection has been terminated by the on hold subscriber and that the on hold subscriber has sent a message. A method of signifying one of the subscriber's desire to return to a communication connection when the communication connection has been placed on hold is also provided.

17 Claims, 10 Drawing Sheets

CALL ON-HOLD IMPROVEMENTS

FIELD OF THE INVENTION

The present invention relates to telephony and in particular to a method and apparatus for allowing a subscriber placed on hold during a communication connection to send a message to another subscriber prior to tearminating the communication connection. The present invention also relates to a method and apparatus for allowing a subscriber to signify to another subscriber their desire to return to a communication connection when the communication connection has been placed on hold.

BACKGROUND OF THE INVENTION

Feature telephone sets which provide a display of the status of calls such as on hold status provide only limited information to a subscriber as to the status of calls. For example, a telephone set used in a key telephone system may have several lines that it may use. When one of the lines is busy, a light adjacent a push button associated with that line illuminates. However, there is no indication that the line is actually in use or who are the parties in the call.

If a caller has placed a call on one line on hold and has made one or more calls on other lines which may have also been placed on hold, lights associated with the lines on hold may flash as a reminder. However, there is no indication as to who is actually on hold. It is often difficult to remember which call on hold belongs to which party. The end result is that calls may be retrieved from hold and the party addressed incorrectly.

When a conference call is made and several conferences are placed on hold and a subscriber wishes to have a private conversation with one or more of the conferences while excluding others, mistakes can often be made with sometimes embarrassing and costly results when taking conferences off hold and bringing them into the private conversation.

To overcome the above-described problems, a human machine interface for telephone feature invocation has been developed and is described in U.S. Pat. No. 5,533,110 to Pinard et al. issued on Jul. 2, 1996 and assigned to Mitel Corporation, assignee of the present invention. The human machine interface provides information to a user which unambiguously indicates which subscribers are party to a call. The human machine interface also provides a clear indication as to the parties placed on hold, removed from a call or added to a call.

In some instances, when a subscriber is placed on hold by another subscriber, the subscriber may wish to terminate the call but before doing so send a message to the other subscriber. In the past, this has required the subscriber to terminate the call, call the other subscriber back, wait to be forwarded to the other subscriber's voice-mail, leave a voice-mail message and then terminate the call. Also, in some instances, when a subscriber has been placed an on hold condition, a subscriber may wish to signify to the other subscriber that they wish to be reconnected. This has not been possible, giving the subscriber the options of either waiting out the on-hold condition or terminating the call and calling the other subscriber back in an attempt to reestablish the communication connection.

Although the human machine interface referred to above provides unambiguous information concerning the parties to a call and the status of the parties to the call, call hold improvements are desired to deal with the above described situations.

It is therefore an object of the present invention to provide a novel method and apparatus for allowing a subscriber placed on hold during a communication connection to send a message to another subscriber prior to terminating the communication connection. It is also an object of the present invention to provide a novel method and apparatus for allowing a subscriber to signify to another subscriber their desire to return to a communication connection when the communication connection has been placed on hold.

SUMMARY OF THE INVENTION

According to one aspect of the present invention there is provided in a communication system wherein a communication connection is established between a communication apparatus of a first subscriber and a communication apparatus of a second subscriber, a method of terminating the communication connection by a subscriber placed on hold comprising the steps of:

(i) displaying to said on hold subscriber a prompt to leave a message;

(ii) in response to selection of said prompt, recording the message left by said on hold subscriber;

(iii) transmitting the message to the other subscriber; and (iv) terminating the communication connection.

In one embodiment, it is preferred that the method further comprises the step of providing a visual indication to the other subscriber that the communication connection has been terminated by the on hold subscriber and that the on hold subscriber has sent a message. It is also preferred that the method further comprises the steps of during the communication connection displaying icons representing the subscribers to both subscribers; and upon termination of the communication connection at step (iv), replacing the icon displayed to the other subscriber representing the on hold subscriber with an icon representing the message. Preferably, the prompt to leave a message is displayed to the on hold subscriber in response to on hold subscriber input.

It is also preferred that during step (ii) the on hold subscriber can record either a voice message, a text message or a video message. A window is displayed to the on hold subscriber which includes a box for a text message, a box for a voice message and a box for a video message. One of the boxes can be selected to allow the on hold subscriber to leave either the voice message, text message or video message.

Preferably, the method further comprises the step of presenting the message to the other subscriber as soon as the other subscriber returns to the communication connection.

In another embodiment, the prompt to leave a message is displayed to the on hold subscriber as soon as the on hold subscriber is placed on hold. The prompt is selected by entering a soft key sequence via the communication apparatus of the on hold subscriber.

According to another aspect of the present invention there is provided in a communication system wherein a communication connection is established between a communication apparatus of a first subscriber and a communication apparatus of a second subscriber, a method of signifying one of the subscribers desire to return to a communication connection when said communication connection has been placed on hold comprising the steps of:

(i) generating a reconnection request via the communication apparatus of one subscriber;

(ii) transmitting the reconnection request to the other subscriber; and (iii) displaying the reconnection request to the other subscriber signifying the one subscribers desire to return to the communication connection.

Preferably, during step (iii) a reestablish communication connection icon is displayed to the other subscriber, and the method further comprises the step of reestablishing the communication connection immediately upon selection of the reestablish communication connection icon. It is also preferred that during step (ii) at least one deny communication connection icon is displayed to the other subscriber and that the method further comprises the steps of transmitting a deny communication connection response to the one subscriber upon selection of the at least one deny communication connection icon and displaying a message to the one subscriber signifying the selection.

Preferably, the method further comprises the steps of during the communication connection, displaying icons representing the first and second subscribers to both subscribers; during an on hold condition displaying to the one subscriber their icon as a ghost and displaying to the other subscriber their icon as a ghost; and generating the reconnection request in response to subscriber input made by selecting a ghost icon.

The present invention provides advantages in that a subscriber placed on hold can send a message to the other subscriber prior to terminating the call avoiding the need to call the other subscriber back to leave a message. The other subscriber is notified that the call has been terminated and that a message has been sent putting that subscriber in immediate context for the message. The present invention also provides advantages in that a subscriber on hold can signal to the other subscriber that they wish to return to a communication connection even though the on hold condition exists.

BRIEF DESCRIPTION OF THE DRAWINGS

Embodiments of the present invention will now be described more fully with reference to the accompanying drawings in which.

DETAILED DESCRIPTION OF THE PREFERRED EMBODIMENTS

Figure 1:
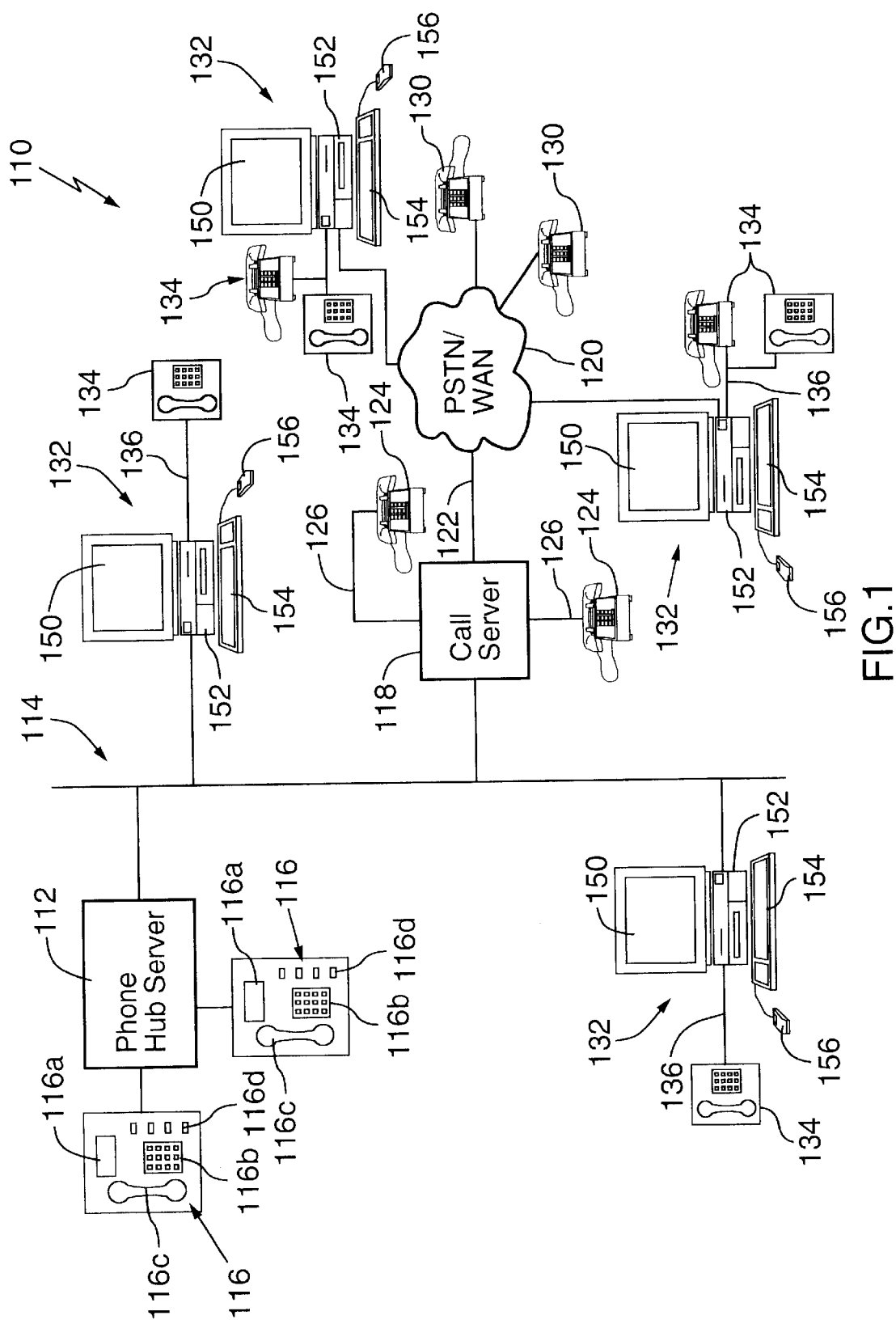
FIG. 1 is a schematic diagram of a communications system over which communication connections between subscribers may be established.
Figure 14:
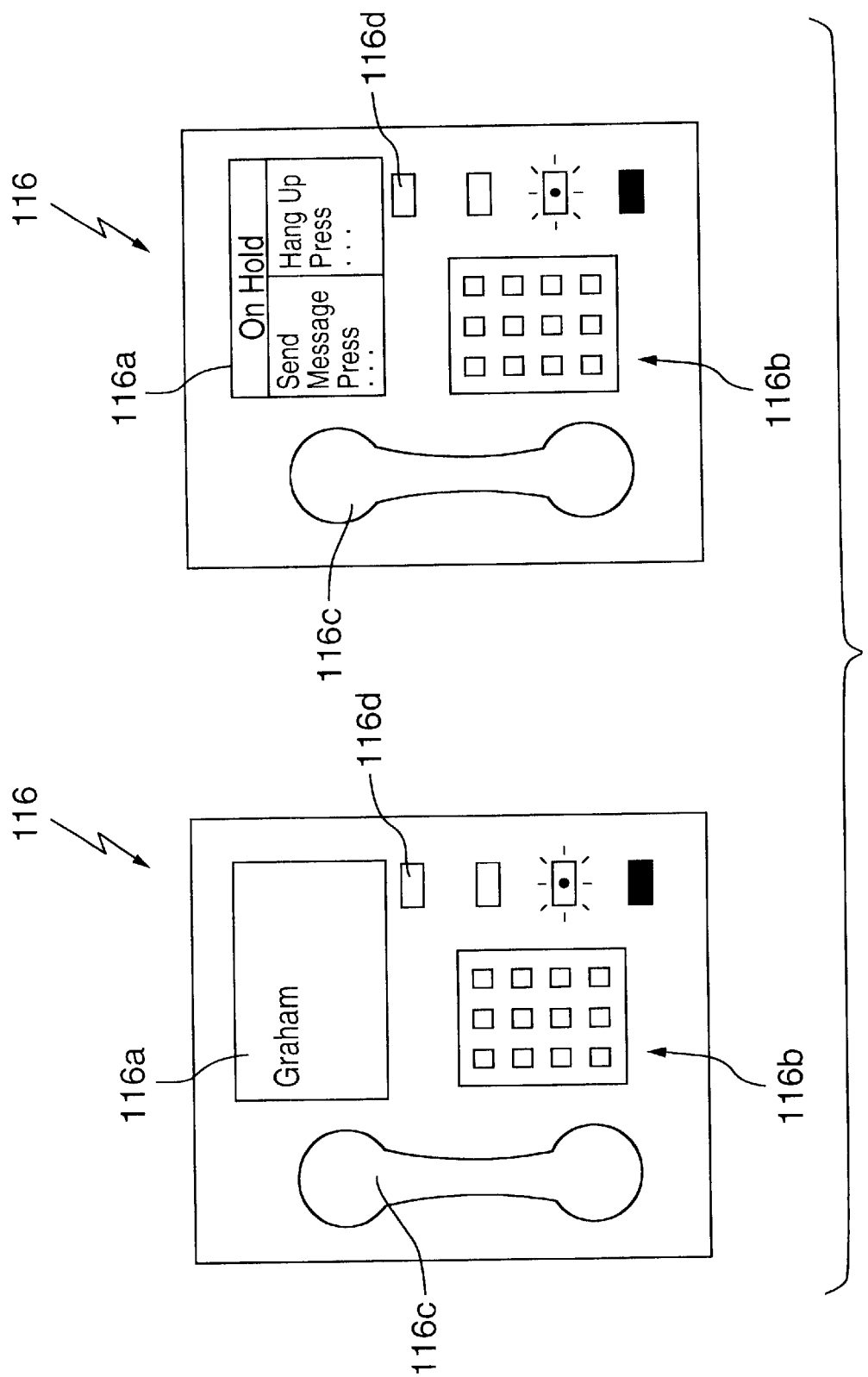
FIG. 14 is a schematic diagram of two subscriber display phone sets forming part of the communications system of FIG. 1.

Referring now to FIG. 1, a communications system is shown and is generally indicated to by reference numeral 110. As can be seen, the communications system includes a phone hub server 112 connected to a local area network (LAN) 114. A plurality of display phone sets 116 (best seen in FIG. 14) are connected to the phone hub server 112. Each display phone set 116 includes a display 116a, a keypad 116b, a handset 116c and a plurality of line select buttons 116d which illuminate when a line is selected or flash when a line is on hold.

A call server 118 is connected to the LAN 114, to a public switched telephone network (PSTN)/wide area network (WAN) 120 via trunks 122 and to stand alone telephones 124 via individual lines 126. Stand alone telephones 130 and personal computers 132 are also connected to the PSTN/WAN 120. Telephones 134 are connected to the personal computers 132 by way of universal serial busses (USB) 136. Personal computers 132 are also connected to the LAN 114 and have telephones 134 connected to them via USBs 136.

The phone hub server 112 and the call server 118 both implement MVIP technology as set out in U.S. Pat. No. 5,657,446 entitled "Local Area Communications Server System" to Pinard et al issued on Aug. 12, 1997, assigned to Mitel Corporation, assignee of the present invention. The phone hub server 112 handles the display phone sets 116 while the call server 118 handles the trunks 122 and stand alone telephones 124.

The communications system 110 is based on the architecture described in U.S. Pat. No. 5,638,494 entitled "Adaptive Communication System" to Pinard et al issued on Jun. 10, 1997 assigned to Mitel Corporation, assignee of the present invention. Accordingly, the servers include telephone interface circuits, conference digital signal processing circuits, dialing circuits and trunk circuits to enable telephone calls to be made. The servers also include agents to process calls.

Each personal computer 132 includes a monitor 150, a processor 152, a keyboard 154 and a pointing device in the form of a mouse 156. The processor 152 executes a telephone applications program which controls the telephone connected to it via agents. In this particular example, the telephone applications program functions as a communications accessory in a Windows environment. The telephone applications program is similar to that disclosed in U.S. Pat. No. 5,533,110 entitled "Human Machine Interface For Telephone Feature Invocation" to Pinard et al issued on Jul. 2, 1996 and assigned to Mitel Corporation, assignee of the present invention.

The telephone applications program controls the views, windows and icons appearing on the monitor 150 of the personal computer 132 during a telephone communications session. When the telephone applications program is called, it creates a user icon in the form of a stick figure representing the user logged into the LAN 114. The telephone applications program also provides a call setup icon which can be used to tell the telephone applications program that a telephone call is to be made by dragging the user icon into the call setup icon. When the call setup icon tells the telephone applications program that a telephone call is to be made, the telephone applications program displays a subscriber directory stored in memory. The subscriber directory includes a list of names in the directory together with associated image icons. Image icons in the directory can be dragged into the call setup icon or names can be entered into a dialog box in the call setup icon to initiate telephone calls. At this stage, the telephone applications program creates an icon of the party to be called and places the icon in the call setup icon beside the user icon. Further specifics of the telephone applications program will now be described with particular reference to FIGS. 2 to 14.

Figure 2:
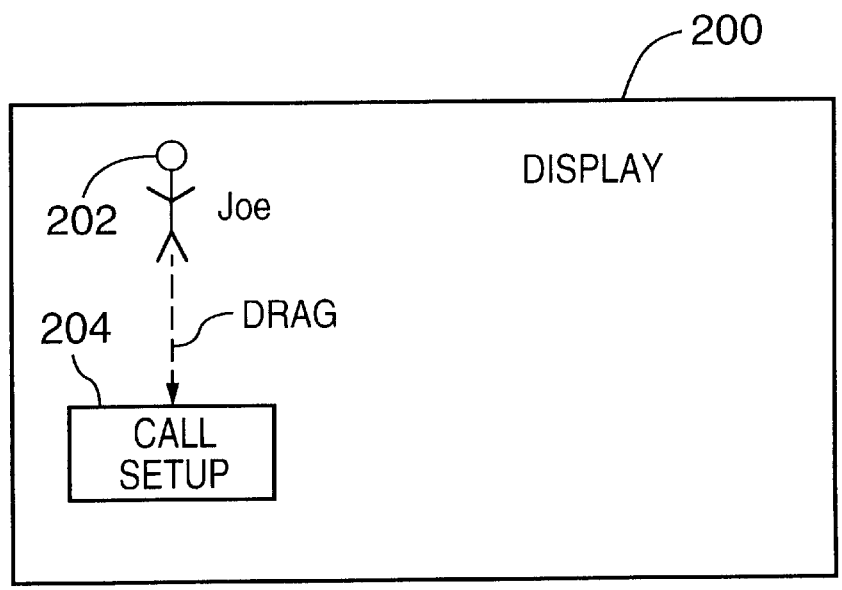
FIGS. 2 to 10 are diagrams of displays on personal computers illustrating a call on-hold improvement in accordance with one embodiment of the present invention.

Referring now to FIG. 2, a window 200 is shown that is presented on the monitor 150 of one of the personal computers 132 when the telephone applications program executed thereby is called. A user icon 202 representing the local user of the telephone 134 is created by the telephone applications program and is displayed in the window 200 with the name of the user (Joe). In this example, the icon 202 is in the form of a stick figure. The telephone applications program also creates and displays a call set up icon 204 which is used to establish a telephone call. As mentioned above, to establish a telephone call, the user moves the user icon 202 into the call set up icon 204 by dragging the icon using the mouse 156 or other pointing device. The telephone applications program interprets this action as a request to initiate a telephone call.

Figure 3:
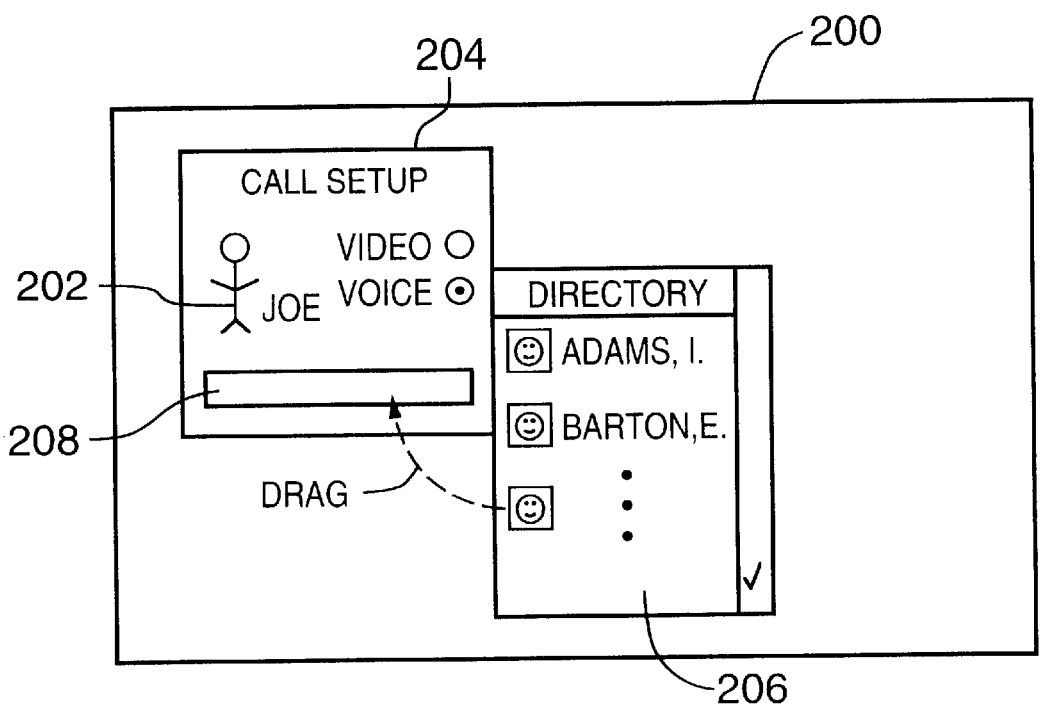
Figure 4:
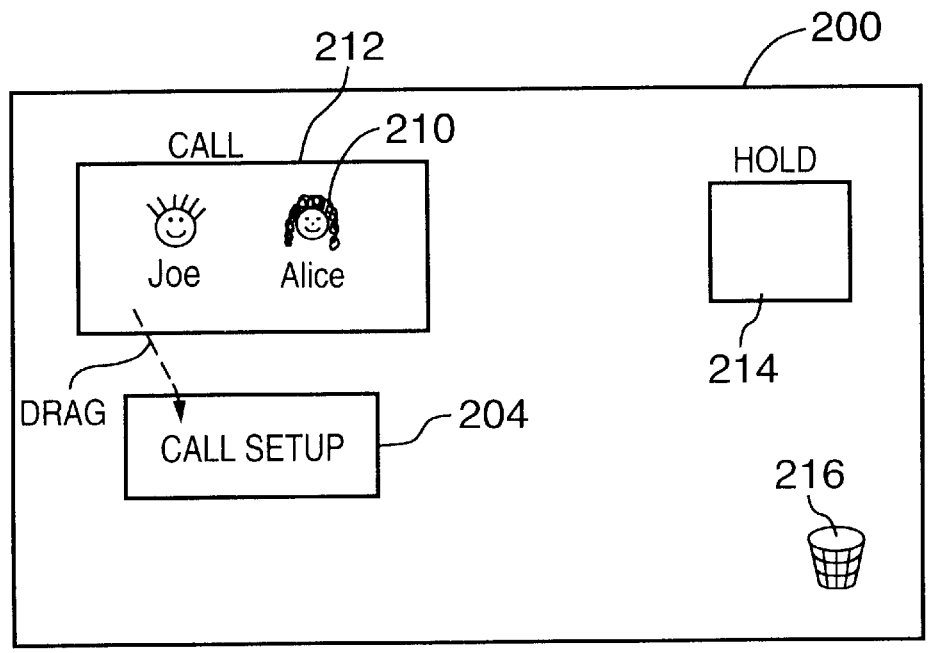
Figure 5:
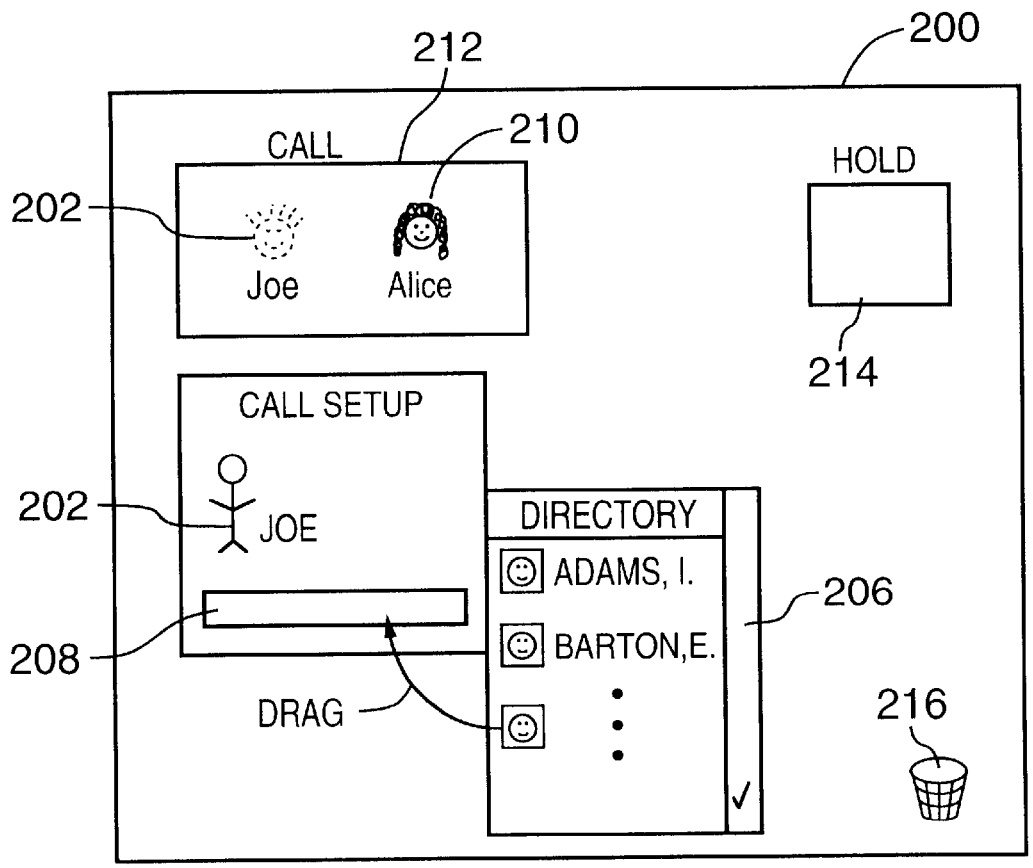
Figure 6:
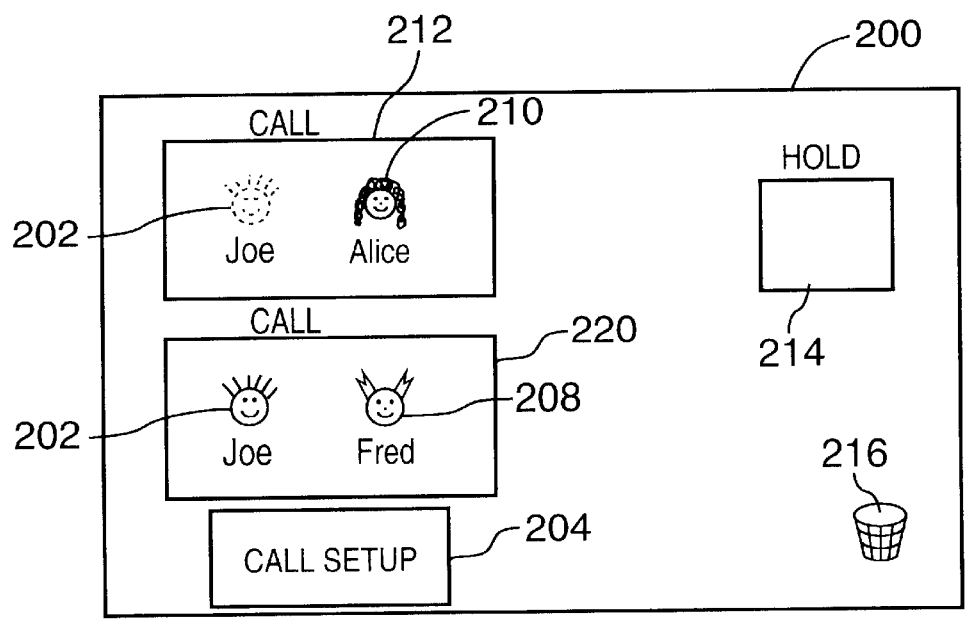
Figure 7:
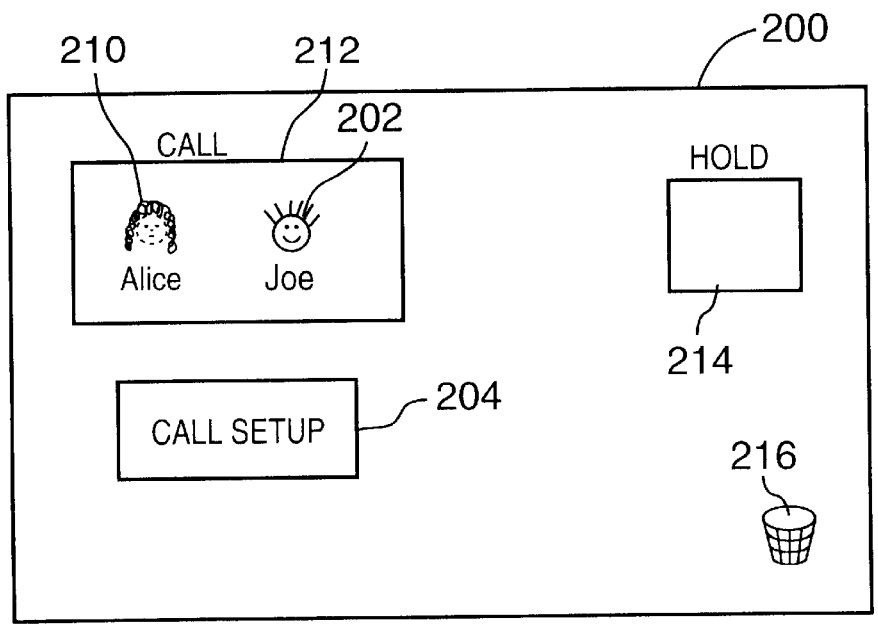
Figure 8:
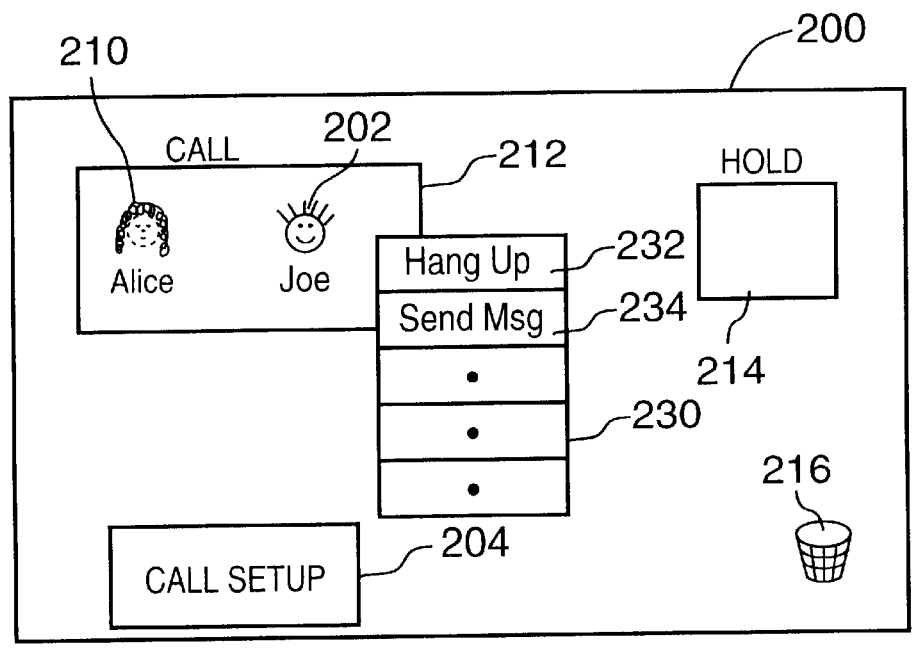
Figure 9:
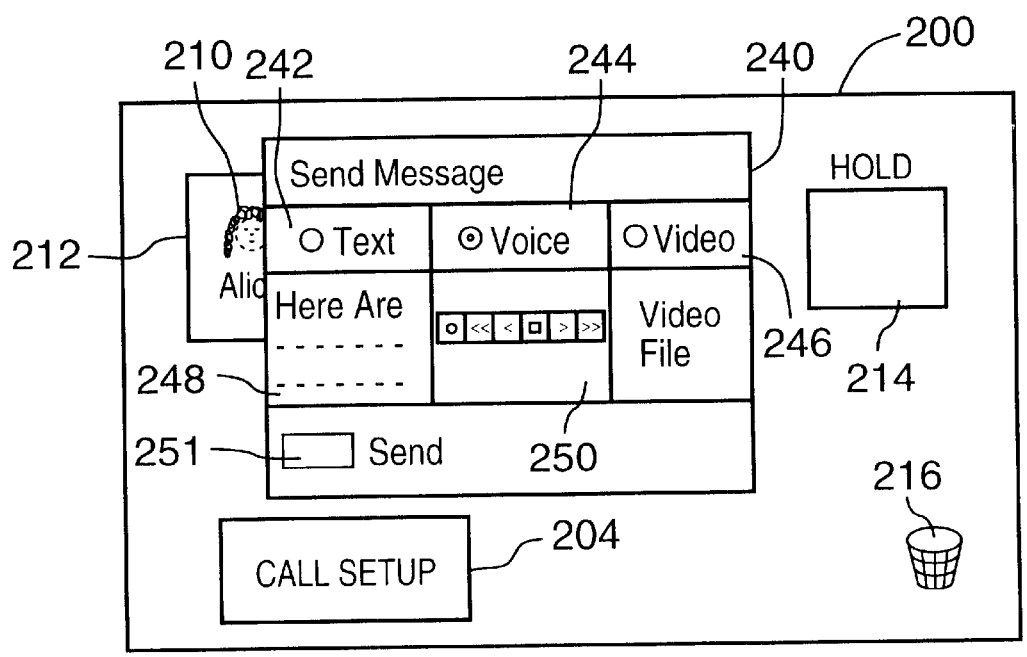

At this point, the telephone applications program displays a directory 206 that is stored in memory of the personal computer 132 in the window 200 (see FIG. 3). The directory 206 includes a list of names and associated image icons. If the telephone call is to be made to a party in the directory, the image icon associated with that party is dragged into the call set up icon 204 using the mouse 156 or the name of the party is typed into a dialog box 208 in the call setup icon 204 and a return command function is invoked.

The telephone application program then creates an icon 210 representing the party to be called and places the icon with the name of the party (Alice) in the call set up icon 204. The telephone applications program then retrieves the telephone number from the directory 206 and causes the call server 118 to dial Alice's telephone number. As soon as Alice answers the call, the call setup icon 204 is changed to a call icon 212 and a new call setup icon 204 is presented in the window 200 at a location spaced from the call icon 212. Hold and terminate call icons 214 and 216 are also displayed in the window 200 (see FIG. 4).

When Alice answers the call, her personal computer 132 calls the telephone applications program which in turn presents a window displaying a call icon 212 showing the same icons 202 and 210 as displayed on Joe's personal computer. If Joe decides to place another call while maintaining the call to Alice, Joe drags his icon 202 into the call setup icon 204 causing the directory 206 to be displayed again. Joe's icon 202 also remains in the call icon 212 but is displayed in ghost form. At this point the image icon representing the next party (Fred) to be called is dragged from the directory 206 into the call setup icon 204 (see FIG. 5). An icon 218 with Fred's name beside the icon is then created by the telephone applications program and is placed in the call setup icon 204. The telephone applications program then retrieves Fred's telephone number from the directory 206, causes the call server 118 to place Alice on hold, and causes the call server to dial Fred's telephone number.

As soon as Fred answers the call, the call setup icon 204 is changed to a call icon 220 including Joe's icon 202 and Fred's icon 218 and a new call setup icon 204 is presented in the window 200. Thus, the monitor 150 of Joe's personal computer 132 presents two call icons 212 and 220, one showing the current telephone communication connection to Fred and the other showing the on-hold communication connection to Alice (see FIG. 6).

When Alice is put on hold as a result of Joe making the second call to Fred, Joe's icon 202 in the call icon 212 is in ghost form to signify visually to Joe that Alice has been put on hold. The telephone applications program executed by Alice's personal computer 132 changes her icon 210 in the call icon 212 to ghost form signifying visually to Alice that the call to Joe has been placed on hold (see FIG. 7). If Alice does not want to wait on hold, Alice can terminate the call immediately either by going on-hook or by dragging her icon 210 into the terminate call icon 216. The telephone applications program recognizes this as a command to go on-hook and terminate the telephone communication connection.

Alternatively, Alice has the option of sending a message to Joe prior to terminating the telephone communication connection. To send a message to Joe, Alice uses the mouse 156 to move the cursor over her ghost icon 210 and performs a right mouse click. The telephone applications program in turn opens a directory 230 having a number of selectable options including a hang-up option 232 and a send message option 234 (see FIG. 8). If the send message option 234 is selected, the telephone applications program opens a send message icon 240 which allows the Alice either to leave a text message, a voice message or a video message (see FIG. 9). The send message icon 240 includes selectable text, voice and video boxes 242, 244 and 246 respectively. If the text box 242 is selected, text can be typed into an associated dialog box 248. If the voice box 244 is selected, a tape recorder 248 is displayed which can be operated using the mouse 156 in a known manner to record a voice message. If the video box 246 is selected, a video file message can be created. Once the message is created, the message can be sent to Joe by pressing a send button 250 in the send message icon 240 using the mouse 156.

When the send button 250 is pressed, the telephone applications program sends the message to the call server 118 which routes the message to Joe. The telephone applications program then terminates the communication connection. The call icon 212 displayed on the monitor 150 of Alice's personal computer 132 is replaced with the call setup icon 204 to allow Alice to initiate another telephone call.

Figure 10:
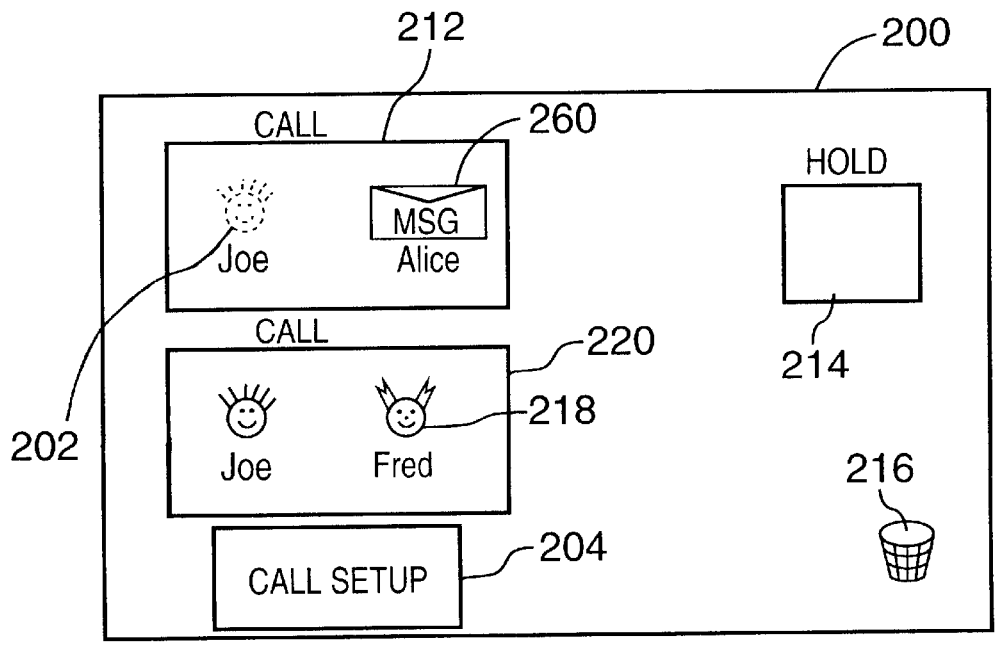
Figure 11:
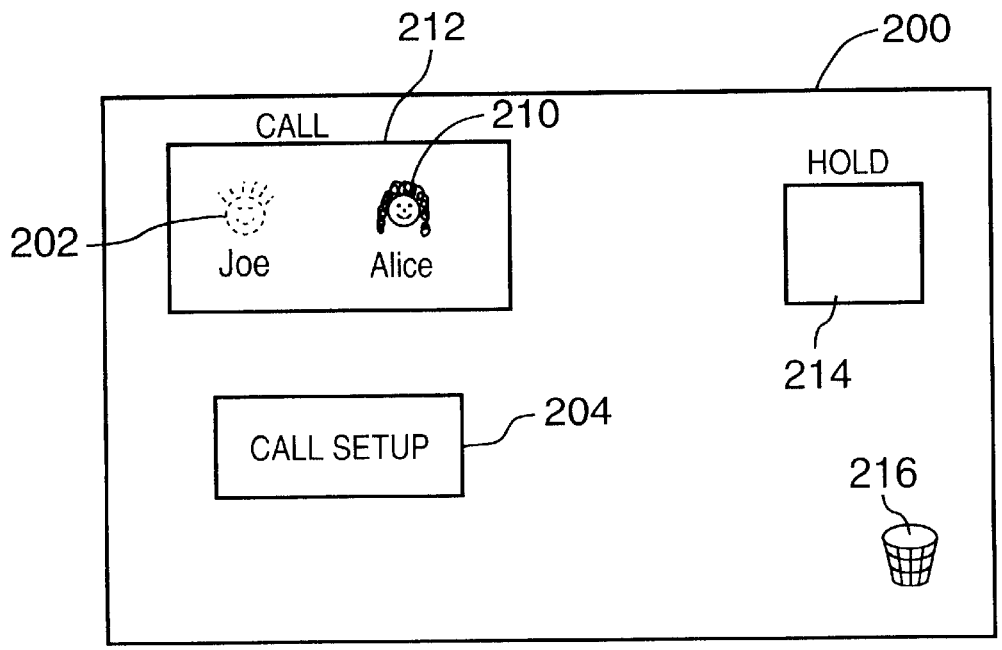
FIGS. 11 to 13 are diagrams of displays on personal computers illustrating a call on-hold improvement in accordance with another embodiment of the present invention.

When the message sent by Alice is received by Joe's personal computer 132, the telephone applications program immediately replaces Alice's icon 210 in the call icon 212 with a message icon 260 to notify Joe that Alice has terminated the communication connection but has left a message placing Joe in immediate context for the message (see FIG. 10). When Joe returns to the call icon 212 either by terminating the call with Fred or by placing Fred on hold, the telephone applications program opens a message window and presents the message to Joe. In the case of a text message, the message is displayed in a text box. In the case of a voice message, a tape recorder icon is presented and is conditioned to play the voice message. In the case of a video message, a video recorder icon is presented and is conditioned to play the video file message.

During a communication connection, either party to the call can place the other party on hold by dragging that party's icon from the call icon into the hold icon 214. For example, if Joe drags Alice's icon 210 into the hold icon 214, the telephone applications program causes the call server 118 to place the communication connection to Alice on hold. When the communication connection is placed on hold, Joe's icon 202 in the call icon 212 as presented in the window 200 on the monitor 150 of Joe's personal computer 132 is shown as a ghost to signify visually that Alice is on hold (see FIG. 11). Likewise, Alice's icon 210 in the call icon 212 displayed in the window 200 on the monitor 150 of Alice's personal computer 132 is shown as a ghost.

During the on-hold condition, if either Joe or Alice wishes to reestablish the communication connection, they can signal the other party. For example, if Joe wishes to signify to Alice that he wants to reestablish the communication connection, Joe places the cursor over his ghost icon 202 and performs a left mouse click. The telephone applications program detects this action and generates a reestablish communication connection request. The reestablish communication connection request is then sent to Alice's personal computer 132.

Figure 12:
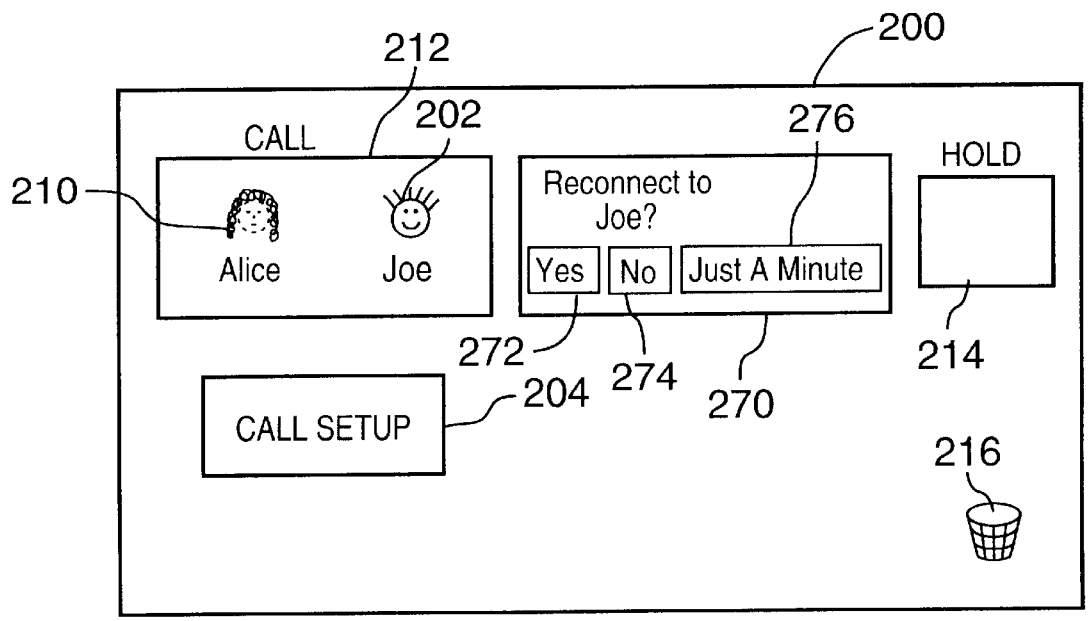
Figure 13:
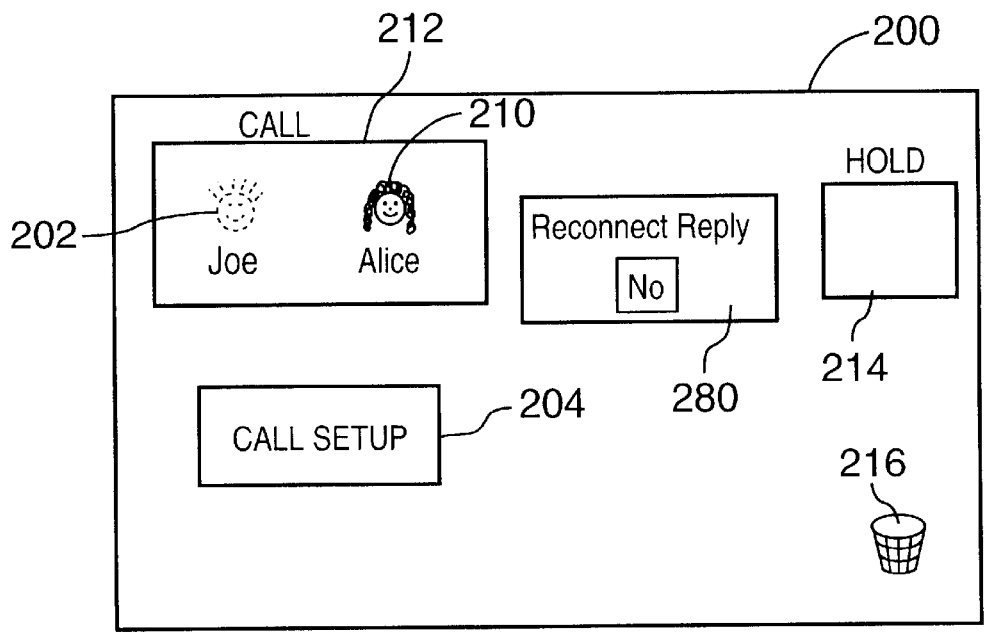

When the reestablish connection request is received by Alice's personal computer, a request connection icon 270 is displayed in the widow 200 presented on the monitor 150 of Alice's personal computer 132 (see FIG. 12). The request connection icon 270 includes three response buttons, namely a "yes" button 272, a "no" button 274 and a "just a minute" button 276. If the "yes" button 272 is selected using the mouse 156, the telephone applications program causes the call server 118 to reestablish the communication connection terminating the on-hold condition. If the no or just a minute button 274 or 276 respectively is selected, the on hold condition is maintained. The telephone applications program however, sends a message back to the Joe responding to the reestablish communication request. The message corresponds with Alice's button selection. When Joe's personal computer receives the message, a reply icon 280 corresponding to Alice's selection is displayed in the window 200 (see FIG. 13). A similar process occurs when Alice wishes to reestablish the communication connection and performs a left mouse click on her ghost icon 210.

The phone hub server 112 also includes telephone applications programs to allow parties using display phone sets 116 to send messages to other parties prior to terminating on-hold communication connections.

When a telephone call is initiated by a caller (John) using a display phone set 116, a line is selected by John causing a light in the line select button 116d associated with the selected line to illuminate. The telephone number of the party being called (Jane) is then dialed. The phone hub server 112 handles the display phone set 116 and causes the call server 118 to dial the telephone number to establish the telephone call. When Jane answers, Jane's name appears in the display 116a of John's display phone set 116 (see FIG. 14). Likewise, when Jane answer's, John's name appears in the display 116a of Jane's display phone set 116.

If John places Jane on hold either by selecting another line to make or answer another call or by pressing a hold button, the on hold communication connection is detected by the telephone applications program. The telephone applications program sends a message to Jane causing the message to be displayed on the display 116a of Jane's display phone set 116 notifying Jane of the on-hold condition and giving Jane the option to terminate the call immediately or to send a message to John prior to terminating the call by entering an appropriate soft key dialing sequence.

When the terminate call soft key sequence is entered by Jane, it is detected by the telephone applications program. The telephone applications program causes the phone hub server 112 to signal the call server 118 to terminate the call. When the send message soft key sequence is entered, it is detected by the telephone applications program and prompts Jane to record a voice-mail message. When the voice-mail message has been completed, the telephone applications program causes the phone hub server 112 to send the voice-mail message to the call server 118 which in turn passes the message to John. The telephone applications program in the phone hub server 112 handling John's display phone set 116 receives and holds the voice-mail message from Jane and updates the display 116a on John's display phone set to notify John that Jane has left a message. When John returns to Jane's line, the voice-mail message is presented to John.

Figure 15:
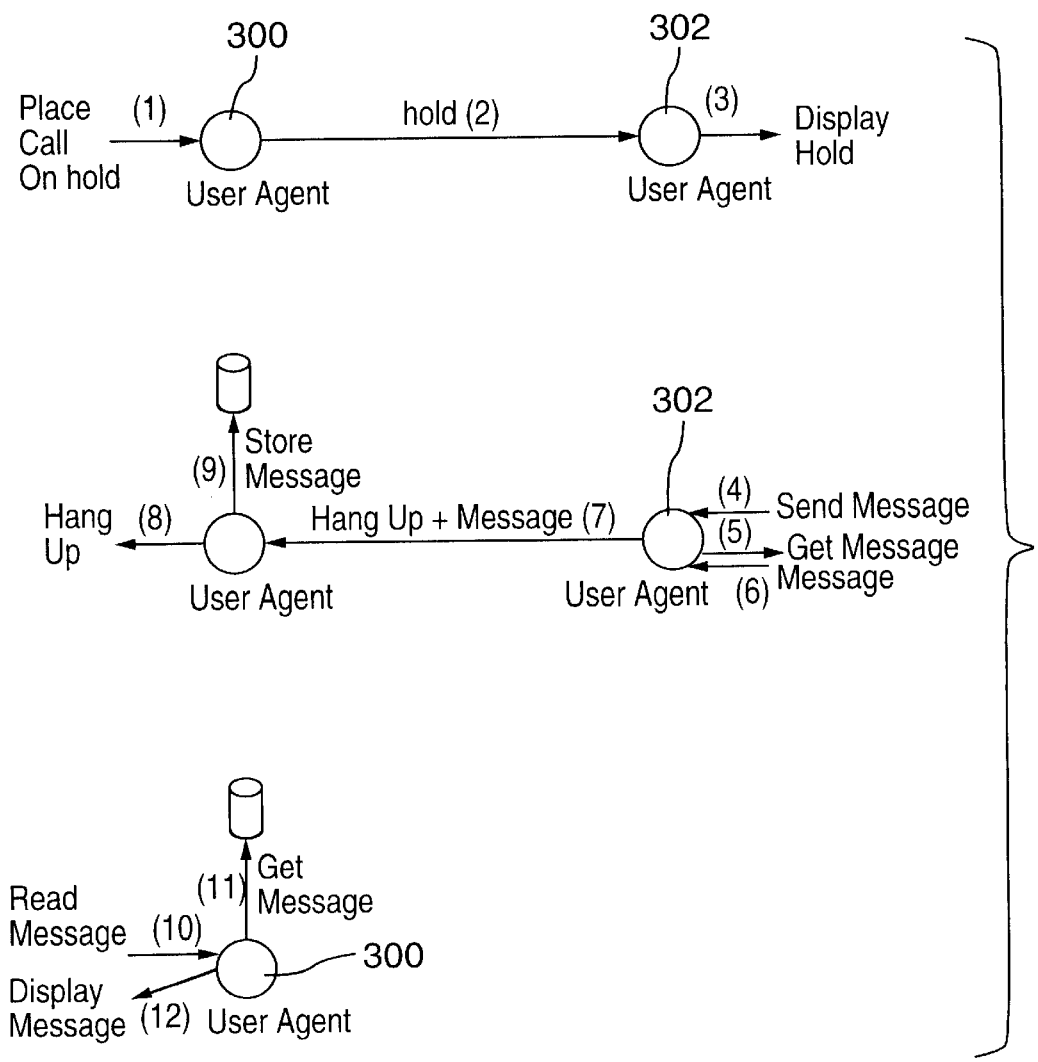
FIG. 15 are schematic diagrams illustrating the agent layout and message flow during handling of the call on-hold improvement of FIGS. 2 to 10.

Referring now to FIG. 15, a message sequence diagram corresponding to FIGS. 2 to 10 is shown wherein agents handle communications. When a call is to be placed on hold (1), the user agent 300 associated with the party placing the call on hold informs the user agent 302 associated with the party to be placed on hold (2). The user agent 302 in turn displays this to the party (3). If the party placed on hold elects to send a message prior to terminating the call, the user agent 302 receives a send message request (4). The user agent 302 asks for the message (5) and when the message is received (6), sends the message together with a hang-up request to the user agent 300 (7). The user agent 300 upon receiving the message and hang-up request notifies the party (8) and stores the message in a database (9). When the party wishes to access the message (10), the user agent 300 retrieves the message from the database (11) and presents the message to the party (12). Phone agents or display agents and desktop controller agents (not shown) are provided to manage the telephones and/or personal computers.

Figure 16:
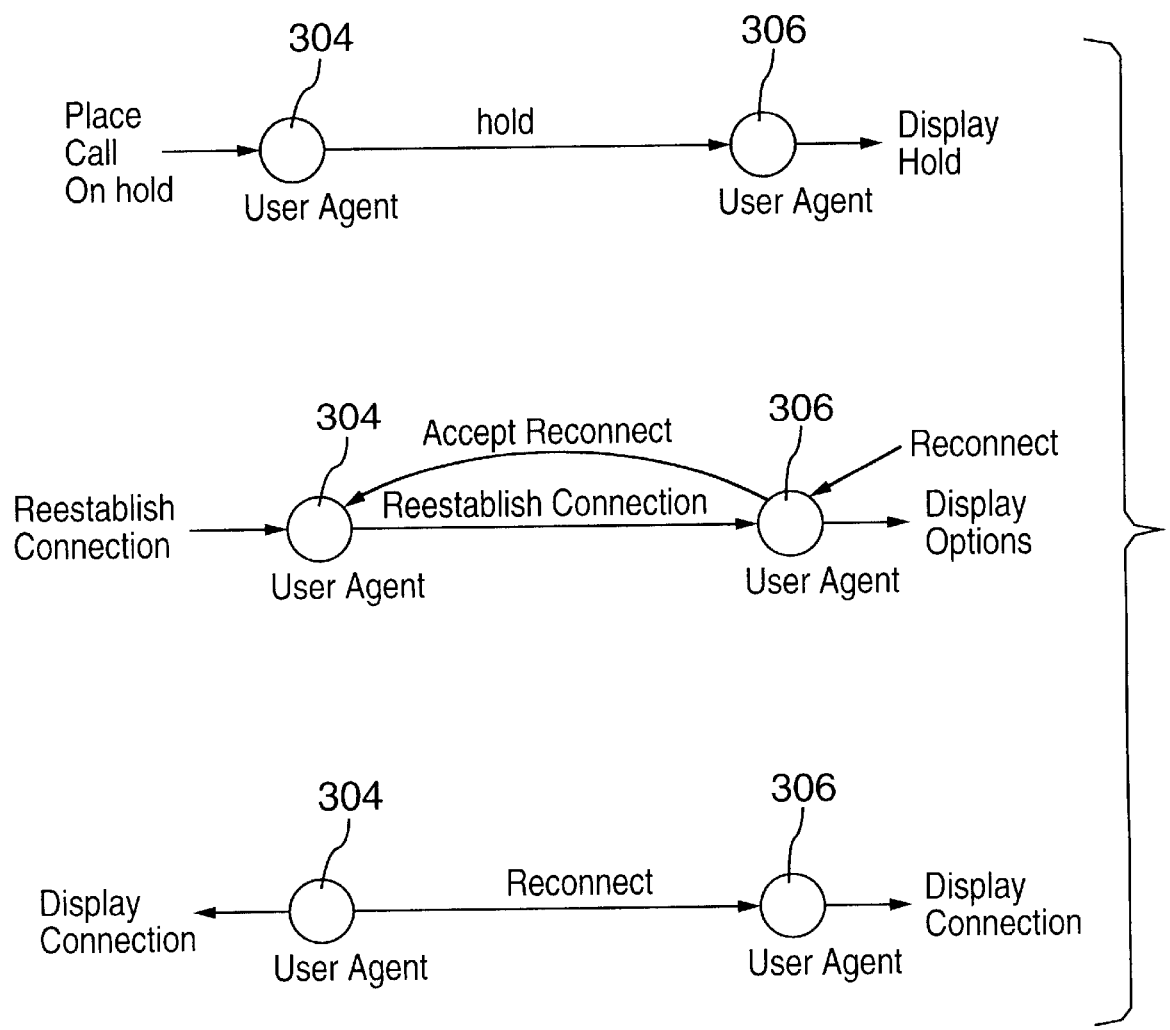
FIG. 16 are schematic diagrams illustrating the agent layout and message flow during handling of the call on-hold improvement of FIGS. 11 to 14.

When parties are on hold and one of the parties wishes to reestablish the communication connection and signal this to the other party, the user agent 304 informs the user agent 306 (see FIG. 16). The user agent 306 in turn informs the party of the reestablish communication connection request and displays the retrieve options to the party. If the party selects the reconnect call option, the user agent 306 is notified and informs the user agent 304 that it is accepting the reestablish communication connection request. The user agent 304 then informs the user agent 306 to reconnect the communication link and the displays of the parties are updated to show that the on-hold condition has been terminated.

As will be appreciated, the telephone applications programs executed by the personal computers and phone hub server allow parties placed on hold to terminate telephone calls but before doing so leave messages for the other parties. This avoids the need for callers to have to hang up and call back to access called parties' voice-mail. The telephone applications program also provides advantages in that a party placed on hold can flag the other party indicating that they wish to be removed from hold and reconnected.

Although the present application has been described with reference to the agent architecture described in U.S. Pat. No. 5,638,494 to Pinard et al, those of skill in the art will appreciate that the on hold improvements can be incorporated into telephony systems using other architectures. Those of skill in the art will also appreciate that variations and modifications may be made to the present invention without departing from the spirit and scope thereof as defined by the appended claims.

We claim:

1. In a communication system wherein a communication connection is established between a communication apparatus of a first subscriber and a communication apparatus of a second subscriber, a method of terminating the communication connection by a subscriber placed on hold comprising the steps of:

(i) displaying to said on hold subscriber a prompt to leave a message;

(ii) in response to selection of said prompt, recording the message left by said on hold subscriber;

(iii) transmitting the message to the other subscriber;

(iv) terminating the communication connection; and (v) presenting a visual indication to said other subscriber that said communication connection has been terminated by said on hold subscriber and that said on hold subscriber has sent a message, said visual indication being presented in a manner to place said other subscriber in immediate context for said message.

2. The method of claim 1 further comprising the step of presenting the message to the other subscriber as soon as said other subscriber returns to the communication connection.

3. The method of claim 1 wherein during said communication connection, icons representing said subscribers are displayed to both subscribers and wherein upon termination of said communication connection at step (iv), the icon displayed to the other subscriber representing the on hold subscriber is replaced with an icon representing said message.

4. The method of claim 3 wherein the prompt to leave a message is displayed to said on hold subscriber in response to on hold subscriber input.

5. The method of claim 4 wherein said hold subscriber input is a mouse click on an icon representing a subscriber.

6. The method of claim 3 wherein during step (ii) said on hold subscriber can record either a voice message, a text message or a video message.

7. The method of claim 4 wherein during step (i) said on hold subscriber is prompted either to send a message prior to terminating the communication connection or to terminate the communication connection immediately.

8. The method of claim 6 wherein at step (ii) a window is displayed to said on hold subscriber, said window including a box for a text message, a box for a voice message and a box for a video message, one of the boxes being selectable to allow said on hold subscriber to leave either a voice message, text message or video message.

9. The method of claim 1 wherein at step (i) the prompt to leave a message is displayed to said on hold subscriber as soon as said on hold subscriber is placed on hold.

10. The method of claim 9 wherein said message is a voice message.

11. The method of claim 10 wherein during step (i) said on hold subscriber is prompted either to send a message prior to terminating the communication connection or to terminate the communication connection immediately.

12. The method of claim 11 wherein said prompt is selected by entering a soft key sequence via the communication apparatus of said on hold subscriber.

13. In a communication system wherein a communication connection is established between a communication apparatus of a first subscriber and a communication apparatus of a second subscriber, a method of signifying one of the subscribers desire to return to a communication connection when said communication connection has been paced on hold comprising the steps of:

(i) generating a reconnection request via the communication apparatus of one subscriber;

(ii) transmitting the reconnection request to the other subscriber; and (iii) in response to the reconnection request, displaying a reestablish communication connection icon signifying the one subscribers desire to return to the communication connection and at least one deny communication connection icon to the other subscriber, said reestablish communication connection icon being selectable to reestablish said communication connection and said at least one deny communication connection icon being selectable to maintain the on hold communication connection.

14. The method of claim 13 further comprising the step of reconnecting the communication connection immediately upon selection of said reestablish communication connection icon.

15. The method of claim 14 further comprising the steps of transmitting a deny communication response to said one subscriber upon selection of said at least one deny communication connection icon and displaying a message to said one subscriber signifying said selection.

16. The method of claim 15 further comprising the steps of: displaying icons representing said first and second subscribers to both subscribers; during an on hold condition displaying to the one subscriber their icon as a ghost icon and displaying to the other subscriber their icon as a ghost icon; and generating said reconnection request in response to subscriber input made by selecting a ghost icon.

17. The method of claim 16 wherein said subscriber input is a mouse click on a ghost icon.

* * * * *